United States Patent
Scheu

(10) Patent No.: US 10,730,766 B2
(45) Date of Patent: Aug. 4, 2020

(54) METHOD AND DEVICE FOR THE PRODUCTION OF DRINKING WATER WITH HIGH SILICATE CONTENT

(71) Applicant: Krones AG, Neutraubling (DE)

(72) Inventor: Dirk Scheu, Bopfingen (DE)

(73) Assignee: Krones AG (DE)

( * ) Notice: Subject to any disclaimer, the term of this patent is extended or adjusted under 35 U.S.C. 154(b) by 21 days.

(21) Appl. No.: 15/850,342

(22) Filed: Dec. 21, 2017

(65) Prior Publication Data
US 2019/0144311 A1    May 16, 2019

(30) Foreign Application Priority Data
Nov. 10, 2017    (DE) .................. 10 2017 010 475

(51) Int. Cl.
| | |
|---|---|
| *C02F 1/46* | (2006.01) |
| *C02F 1/469* | (2006.01) |
| *C02F 1/20* | (2006.01) |
| *C02F 1/44* | (2006.01) |
| *C02F 1/42* | (2006.01) |
| *C02F 1/68* | (2006.01) |
| *B01D 61/44* | (2006.01) |

(Continued)

(52) U.S. Cl.
CPC .......... *C02F 1/4693* (2013.01); *B01D 61/445* (2013.01); *C02F 1/20* (2013.01); *C02F 1/42* (2013.01); *C02F 1/441* (2013.01); *C02F 1/4695* (2013.01); *C02F 1/68* (2013.01); *C02F 1/5236* (2013.01); *C02F 1/66* (2013.01); *C02F 5/02* (2013.01); *C02F 2103/007* (2013.01); *C02F 2103/06* (2013.01); *C02F 2103/08* (2013.01)

(58) Field of Classification Search
CPC ...... C02F 1/4693; C02F 1/20; C02F 2103/08; C02F 2103/06; C02F 210/007; B01D 61/445

See application file for complete search history.

(56) References Cited

U.S. PATENT DOCUMENTS

| | | | |
|---|---|---|---|
| 4,557,815 A * | 12/1985 | Scott ...................... | C01B 33/32 204/517 |
| 2004/0188352 A1 | 9/2004 | Dey et al. | |

(Continued)

FOREIGN PATENT DOCUMENTS

| | | |
|---|---|---|
| DE | 19942227 | 3/2001 |
| DE | 60132625 | 1/2009 |

(Continued)

*Primary Examiner* — Arun S Phasge
(74) *Attorney, Agent, or Firm* — Finch & Maloney PLLC

(57) ABSTRACT

The present disclosure relates to a method for the production of drinking water with high silicate content, including the steps of mixing demineralised raw water and a waterglass solution comprising sodium and/or potassium silicate; and subjecting at least one part of the mixture to an ion exchange process to reduce the concentration of sodium and/or potassium. Furthermore, the present disclosure relates to a device for the production of drinking water with high silicate content, the device including a mixing device for mixing demineralised raw water and a waterglass solution comprising sodium and/or potassium silicate, an ion exchanger to subject at least one part of the mixture to an ion exchange process to reduce the concentration of sodium and/or potassium.

20 Claims, 3 Drawing Sheets

(51) Int. Cl.
    *C02F 5/02*     (2006.01)
    *C02F 1/52*     (2006.01)
    *C02F 1/66*     (2006.01)
    *C02F 103/00*     (2006.01)
    *C02F 103/06*     (2006.01)
    *C02F 103/08*     (2006.01)

(56) References Cited

U.S. PATENT DOCUMENTS

2005/0247626 A1    11/2005    Clausse et al.
2006/0231491 A1*   10/2006   Mukhopadhyay ... B01D 61/022
                                                    210/639
2011/0064824 A1    3/2011    Lascoste et al.

FOREIGN PATENT DOCUMENTS

| | | |
|---|---|---|
| DE | 102008052001 A1 | 4/2010 |
| DE | 102017010475 A1 | 5/2019 |
| EP | 3483124 A1 | 12/2017 |
| JP | H0884992 A | 4/1996 |
| KR | 10-2012-0028108 | 3/2012 |
| KR | 101152895 B1 | 3/2012 |
| KR | 1020120115873 | 7/2013 |
| RU | 2463059 | 10/2012 |
| WO | 2004112515 A1 | 12/2004 |
| WO | 2011009950 A1 | 1/2011 |
| WO | 2011010188 A1 | 1/2011 |
| WO | 20170102913 | 6/2017 |

\* cited by examiner

US 10,730,766 B2

METHOD AND DEVICE FOR THE PRODUCTION OF DRINKING WATER WITH HIGH SILICATE CONTENT

The present disclosure refers to a method for the production of drinking water with high silicate content, as well as to a device for the production of drinking water.

State of the Art

Against the backdrop of increasing drinking water consumption, which is associated with decreasing water quality, it is nowadays necessary to use different cleaning steps for the treatment of raw-water in the production of drinking waters. In particular, it is customary to produce bottled drinking water by demineralisation of raw water, for example by means of reverse osmosis and subsequent addition of mineral salts. The pH value is often adjusted by adding bases or acids during mineralization or before reverse osmosis.

This has the advantage that a constant drinking water quality and uniform sensory properties can be guaranteed even when using different types of raw water. Furthermore, it is possible to selectively add a variety of additives such as mineral salts, which have health-beneficial properties, to the drinking water. The main mineral components in the water are calcium, magnesium, sodium, potassium, bicarbonate, sulphate, chloride, nitrate, fluoride and silicate, which have positive effects on the human body for various reasons. For example, calcium is needed in the human body for bone formation. In particular, the element silicon, which is present in drinking water primarily in the form of silicate, has various positive properties on the human body, so it is advantageous to take up silicates over the drinking water. For example, it is known that silicates are able to bind toxic aluminium and thus prevent or alleviate neurodegenerative diseases such as Alzheimer's (v. Rondeau, American Journal of Epidemiology, 169, 4, 2009, pages 489-496; Exley et al., Journal of Alzheimer's Disease, 10, 2006, pages 17-24).

In the state of the art, several approaches are known to enrich silicon in higher concentrations in drinking water in order to supply this element to the human body in sufficient quantities. For example, the US 2014/0271995 A1 shows a method for producing drinking water, in which $SiO_2$ is added as an additive to achieve the desired amount of silicate in drinking water. CN 104098169 B further reveals the addition of amorphous Si crystals as particles or powders to purified water. In general, these approaches have the disadvantage that the silicon is used in the form of $SiO_2$ (i.e. silica). However, silica has a relatively low solubility in the acidic and neutral pH range, so that at least some complex process steps such as filter steps must be carried out in order to adjust the desired silicate content in the drinking water and to remove unwanted particles.

Further WO2011/009950 A1 and WO2011/010188 A1 disclose methods for enriching ortho silica ($[Si(OH)_4]$) in drinking water, where a reverse osmosis process step with subsequent electrodialysis is used to first enrich silicon in the water and then remove unwanted minerals. These procedures are, however, unfavorable from a commercial point of view, since they only use the retentate (which is enriched with silicon) obtained from reverse osmosis for drinking water production, but the obtained permeate is discarded.

Overall, the methods disclosed in the state of the art have the disadvantage that only using elaborate equipment, drinking water with high silicate content can be produced economically in large quantities.

As an alternative silicon source to silica, for example, waterglass exists. Aqueous solutions of sodium, potassium, and/or lithium silicate, which have a high solubility in water, are referred to as waterglass. In particular, waterglass from sodium or potassium silicates is available commercially in large quantities and at the same time contains the drinking water-relevant elements sodium and potassium, and could therefore potentially serve as an additive for silicate containing drinking water. However, waterglass from sodium or potassium silicates has not been used for the commercial production of drinking water, as this would also entail a high increase in sodium and/or potassium concentration in drinking water. This is undesirable for health reasons and is also associated with worsened sensory properties.

Object of the Present Disclosure

Thus, the object of the present disclosure is the provision of a method for producing drinking water, which has a high silicate content, in which the concentration of other minerals, for example, sodium or potassium is selectively adjustable, and which allows the production of large volumes of drinking water in an economically way. Furthermore, the task is to provide a device for the production of drinking water, with which a drinking water is economically produced in large quantities, wherein the drinking water has a high silicate content, and in which the concentration of other minerals, such as sodium or potassium can be selectively adjusted.

SUMMARY

This task is solved by the method according to claim 1. Preferred embodiments of the method are defined in the sub-claims 2 to 15, which are also included in combination with each other. Further, the task is solved by the device according to claim 16. Preferred embodiments of the device are defined in the sub-claims 17 to 20, which are also included in combination with each other.

DETAILED DESCRIPTION

Figure 1:
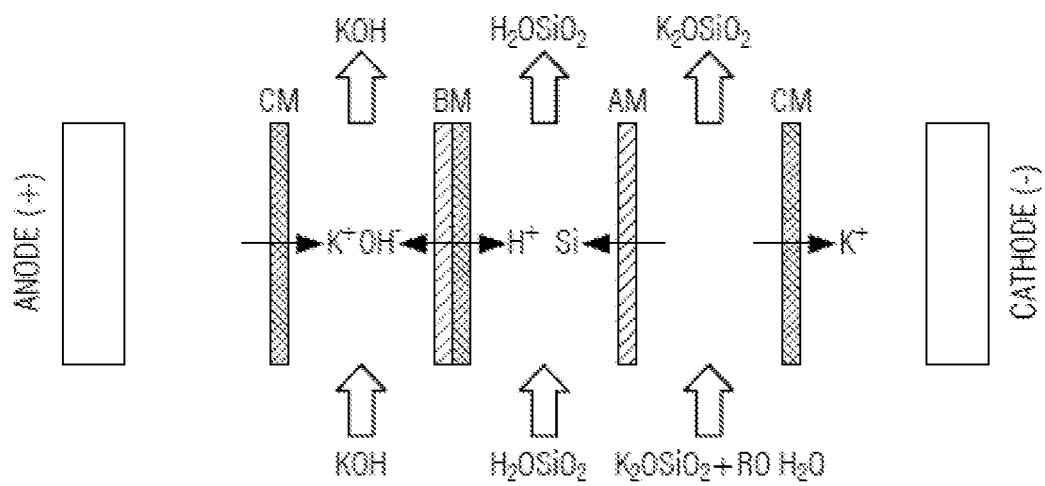
FIG. 1 shows schematically the principle of a reverse electrodialysis with a cation, anion and bipolar membrane, in accordance with the present disclosure.

The process for producing drinking water with high silicate content in accordance with the present disclosure comprises the following steps: Mixing of demineralised raw water with a waterglass solution, comprising sodium and/or potassium silicate, and subjecting at least one part of the mixture to an ion exchange process to reduce the concentration of sodium and/or potassium.

The demineralized raw water, which is mixed with the waterglass solution, can be produced by suitable treatment processes of e.g. groundwater, surface water, river water or sea water. All known methods for demineralization of raw water can be used. In particular, demineralization via reverse osmosis (also referred to as "Osmosis reversal", OR) is preferred. All existing mineral substances are removed from the water. Reverse osmosis processes are known in the state of the art and are not described here further. The demineralized raw water corresponds to the permeate of the reverse osmosis process, from which the so-called retentate (i.e. the proportion of water which has a high concentration of minerals after reverse osmosis) was separated. The term "demineralised raw water" in the sense of the present disclosure defines pure water, which has a total solids content of preferably 5 ppm or less. The total solids content corresponds to the dry residue. In addition, further cleaning processes can be carried out for the purification or treatment of raw water, which are sufficiently well known in the state of the art.

The term 'waterglass solution' according to the present disclosure defines an aqueous solution, comprising sodium and/or potassium silicate, and is preferably a saturated solution. In embodiments, the concentration of sodium and/or potassium silicate in the waterglass solution is 1 mol/L or higher, preferably 2 mol/L or higher, more preferably 3 mol/L or higher, in particular preferably greater 3.2 mol/L. The production of such waterglass solutions is known in the state of the art and is not described here further.

By mixing the demineralised raw water and the waterglass solution, comprising sodium and/or potassium silicate, a mixture is produced, the silicate concentration of which can be adjusted according to the mixing ratio, so that a drinking water with a high silicate content can be produced. Preferred mixing ratios of waterglass solution to water are mass-based in the range between 1:10 to 1:10000, preferably 1:100 to 1:5000, more preferred 1:184 to 1:3061.

However, the mixture of the demineralised raw water and the waterglass solution has a very high concentration of sodium and/or potassium, so that the mixture, at least at relevant mixing ratios in relation to the silicate, without a subsequent treatment, is only suitable to a certain extent for drinking water use, as this would be accompanied by undesirable sensory properties. For this reason, according to the present disclosure at least part of the mixture undergoes an ion exchange process to reduce the concentration of sodium and/or potassium, i.e. to the desired concentration of sodium and/or potassium in the resulting drinking water.

All common ion exchange processes can be used according to the present disclosure. Examples include processes based on the use of column exchangers, parallel flow exchangers, counterflow exchangers, layered bed exchangers, multi-chamber exchangers, mixed bed exchangers, double flow exchangers or sandwich exchangers. The type of materials that can be used is not limited and includes e.g. synthetic resins, clay or zeolites. Furthermore, the ion exchange process can be done by electrochemical processes using membranes, in particular via reverse electrodialysis and/or electro ionisation.

The term 'ion exchange process' according to the present disclosure comprises all processes which are suitable to remove cations, and in particular sodium and/or potassium, from the mixture of the demineralized raw water and the waterglass solution and to replace same by $H^+$. The concentration of anions, such as silicate, is not altered by the ion exchange process.

For this purpose, the pH value of the waterglass solution or the mixture of the demineralised raw water and the waterglass solution is preferably in the basic range, such as a pH of 9 or higher, as this causes a higher solubility of the sodium and/or potassium silicate. So the solubility at pH 9 or higher is 250 mg/l $SiO_2$ or more. In comparison, the solubility in neutral or acidic pH is lower, e.g. approx. 150 to less than 250 mg/l $SiO_2$.

However, the ion exchange process decreases the pH again, so that the process is preferably carried out in such a way that the resulting drinking water has a neutral pH value. This pH shift during the ion exchange process is also the reason why it is not possible to subject a saturated waterglass solution to an ion exchange process, as otherwise during the ion exchange process silicate would precipitate. In an embodiment of the method, it is therefore necessary to perform the mixing of the demineralized raw water with the waterglass solution before the ion exchange process, i.e. it is not possible to rid a concentrated water glass solution of sodium and/or potassium to then add the demineralized raw water only after the ion exchange process.

With the method of the present disclosure it is possible to produce drinking water which has a high silicate content in large quantities economically. Further, the concentration of other minerals such as sodium or potassium can be selectively adjusted.

In a preferred embodiment, the ion exchange process is a reverse electrodialysis process and/or an electro ionisation process.

Reverse electrodialysis is preferably used because it allows a particularly effective removal of sodium and/or potassium. The reverse electrodialysis (also referred to as "Electrodialysis reversal"; EDR) uses electrical voltage to separate ions according to their charge. The principle of reverse electrodialysis with a cation, anion and bipolar membrane is depicted in FIG. 1. The anions and cations of the aqueous solution of demineralised raw water (RO $H_2O$) and a waterglass solution, comprising potassium silicate ($K_2OSiO_2$), are separated via a sequence of cation membranes (cm), anion membranes (AM) and bipolar membranes (BM) by applying electrical voltage. The cation membrane is designed in such a way that only cations can permeate, while only anions permeate the anion membrane. Bipolar membrane columns separate water molecules into hydrogen ions and hydroxide ions, preventing other ions from switching to the other side of the membrane. After performing the procedure, a separation into an acid and a base, i.e. silica and potassium hydroxide, is done. Commercially available equipment can be used to carry out the reverse electrodialysis. Suitable EDR systems are distributed, for example, by the manufacturers Mega A.S./Czechia or Fujifilm Manufacturing Europe B.V./Netherlands. The execution of the reverse electrodialysis is carried out according to the manufacturer's specifications.

Figure 2:
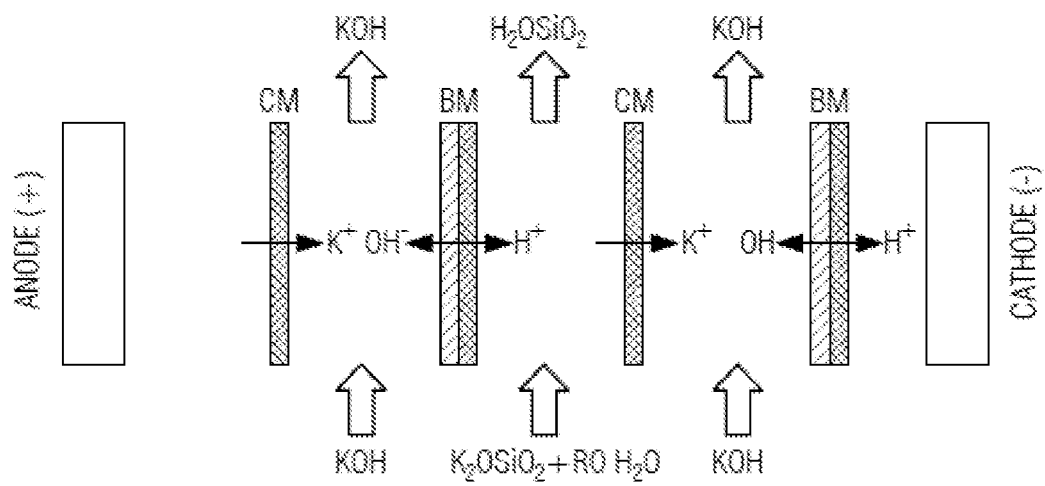
FIG. 2 shows a schematic embodiment of a reverse electrodialysis with the exclusive use of a bipolar and/or cation membrane, in accordance with the present disclosure.

In one embodiment, the reverse electrodialysis is performed with the exclusive use of a bipolar and/or cation membrane. A corresponding embodiment is depicted in FIG. 2, where only cation membranes and bipolar membranes are used. This embodiment is advantageous, since the ion transfer can be carried out faster and more efficiently. Furthermore, it was surprisingly observed that unfavourable odors, which occurred in particular in an embodiment according to FIG. 1 under implementation at basic pH values, were not detected in the embodiment according to FIG. 2. Another advantage of this embodiment is that no significant loss of silicate occurs in the membrane. In addition, such a membrane arrangement in an EDR system makes it possible to prevent that sulfate ions, which can be used as an electrolyte to increase the conductivity, migrate into the product.

In a different embodiment, the ion exchange process is an electro deionisation (EDI). Electro deionization processes are known in the state of the art. Preferably, the EDI is carried out with SAC resin in the $H^+$ cycle. The regeneration of the EDI is carried out continuously by the applied voltage and the associated splitting of water at the bipolar membranes. Suitable EDI systems, for example, are distributed by the manufacturers SnowPure Water Technologies/USA or EVOQUA Water Technologies LLC. The electro deionisation is carried out according to the manufacturer's specifications.

Preferably, the waterglass solution is a potassium silicate waterglass solution (CAS No. 1312-76-1). Potassium silicate waterglass solutions are slightly more expensive than sodium silicate water glass solutions. However, due to their specific manufacturing process, sodium silicates have the disadvantage that undesirable ingredients, such as amines, can be present, which negatively affect the quality and sensory of the water.

Preferably, the mixing of the demineralized raw water and the waterglass solution is carried out in such a way that the concentration of the silicate in the mixture corresponds to the target silicate concentration in the drinking water. The target silicate concentration in drinking water is preferably in the range of 50 mg/l or higher, more preferred 80 mg/l or higher, in particular preferably 100 mg/l or higher. Such a process design is commercially preferred, because for example, further dilution steps are no more required. Further, this silicate concentration in drinking water is higher than the concentration of usual drinking water.

Preferably, the ion exchange process is carried out in such a way that the concentration of sodium and/or potassium correspond to the target concentration in the drinking water. The concentration of sodium and/or potassium is preferably in the range of 0-20 mg/L, especially in the range of 0-10 mg/L. Such low concentration is preferred for health reasons and does not show any deteriorating sensory properties.

The process is particularly suitable to produce drinking water with the following characteristics: pH: 6.5-8.5, conductivity: 50-500 µS/cm, Ca: 0.5-50 mg/L, Mg: 0.5-50 mg/L, K: 0.5-20 mg/l, Na: 0.5-50 mg/L, Cl: 0.5-50 mg/L, $HCO_3$: 0.5-350 mg/L, $SiO_2$:15-250 mg/l, Sulphate: 0.5-50 mg/L. The pH value can be determined using potentiometry or ion-sensitive field-effect transistors. Standard conductivity sensors can be used to measure conductivity. Suitable measuring methods for determining the concentrations are, for example, known from DIN EN ISO 11885, DIN EN ISO 10304-1 or DEV D8.

In a preferred embodiment, the procedure further includes the step of adjusting the concentration of calcium and/or hydrogen carbonate. This step is performed after the ion exchange process. The adjustment is preferably accomplished with a method that involves the introduction of a flow of $CO_2$ gas into at least one part of the mixture and subsequently bringing the treated part into contact with solid calcium carbonate. In particular, the mixture with $CO_2$-gas is guided through a mineral column or a filter or a filter bed made of solid calcium carbonate (limestone). The product is $Ca(HCO_3)_2$. The $CO_2$-gas dosing can also be carried out in a circulation line.

Preferably, in this process step only a part of the water is brought into contact with the flow of $CO_2$ gas passed over the filter. This subflow is then merged with the by-passed part of the water. A downstream pH measurement can be used to monitor the $CO_2$ dosage. The calcium-carbonate/carbonic acid equilibrium can therefore be used to determine the residual $CO_2$ content. For example, a measured pH of greater than 8.2 indicates that the total $CO_2$ is bound as $HCO_3$ and/or carbonate. The basic principle, for example, is revealed in WO2017/102913 A1. In this way, the calcium and/or hydrogen carbonate ion concentration in drinking water can be adjusted selectively and effectively.

In a further preferred embodiment, the procedure also includes a step of adjusting the concentration of magnesium. This step is performed after the ion exchange process. The adjustment of the concentration of the magnesium is carried out in an analogous manner to the step of setting the concentration of calcium and/or hydrogen carbonate ions, wherein after a part of the water is mixed with $CO_2$ gas a contact with solid, half-burned dolomite is carried out. Semi-burned dolomite includes $CaCO_3.MgO$. It has to be taken into account that by contacting with semi-burned dolomite also a part of the calcium is dissolved, which must be considered for the overall consideration. Alternatively, non-burned dolomite may be used for the dosage of magnesium. In this way, the Mg concentration in drinking water can be adjusted purposefully and effectively.

Preferably, the procedure is carried out in such a way that the feeding of the $CO_2$ gas stream in the process step of the adjustment of the concentration of calcium and/or hydrogen carbonate and in the process step of the adjustment of the concentration of magnesium is combined. This enables a particularly effective process design. It is then preferred to recycle the $CO_2$ gas stream, which is advantageous for environmental reasons.

The sequence of the steps of the adjustment of the concentration of calcium and/or hydrogen carbonate and the step of adjustment of the concentration of magnesium is arbitrary. In a preferred embodiment, the step of adjusting the concentration of calcium and/or hydrogen carbonate and the step of adjusting the concentration of magnesium are carried out in separate containers. Thus, the individual processes can be controlled and monitored more easily, so that a targeted dosage of the desired concentrations in drinking water is possible. However, the present disclosure also includes a procedure, wherein the two steps are carried out in one container.

Further, the procedure can comprise a step of the adjustment of the concentration of anions. This step is performed after the ion exchange process. The anions are preferably selected from the group, comprising chloride and sulphate. Preferably, the step of setting the concentration of anions is performed with a method that involves mixing at least one part of the water with one or more soles, preferably comprising $CaCl_2$, $MgCl_2$, $MgSO_4$, NaCl, NaF or KF. This brine/sole is mixed in water before the dosage and is added as a solution in the appropriate quantity. The step of adjusting the concentration of anions can be performed between or after the step of the adjustment of the concentration of calcium and/or hydrogen carbonate and the step of adjusting the concentration of magnesium. In this way, other desired mineral salts can be added effectively.

In a preferred embodiment, the drinking water with a high silicate is a still (non-sparkling) drinking water. For the method, this means that the process further comprises a step in which $CO_2$, preferably via a vacuum degassing or membrane degassing, is removed. Such $CO_2$ degassing is known and is not described here further. Preferably, the removal of the $CO_2$ is carried out by vacuum degassing, among other things using $O_2$ as a stripping gas. This step is preferably carried out after the steps for the dosing of mineral salts. Preferably, at the same time the pH value is adjusted in the drinking water. In this case, the pH value can be used as a control variable for the $CO_2$ removal.

The present disclosure further relates to a device for the production of drinking water with high silicate content. The device comprises a mixing device for mixing demineralised raw water and a waterglass solution, comprising sodium and/or potassium silicate, and an ion exchanger to subject at least one part of the mixture to an ion exchange process to reduce the concentration of sodium and/or potassium.

This device is suitable to perform a method for the production of drinking water with high silicate content as described above. With this device, drinking water in large-scale quantities can be produced economically, wherein the drinking water has a high silicate content, and in which the concentration of other minerals such as sodium or potassium is selectively adjustable. Other advantages and embodiments described in relation to the method also apply to the device.

Preferably, the ion exchanger is a component for performing reverse electrodialysis and/or electro deionisation. Preferred is a reverse electrodialysis process, only comprising bipolar and/or cation membranes.

The device preferably comprises one or more of the following components: A component for adjusting the concentration of calcium and/or hydrogen carbonate, comprising a $CO_2$ gas feed unit and a filter unit comprising solid calcium carbonate, and preferably a $CO_2$ gas return/recycle unit; a component for adjusting the concentration of magnesium, comprising a $CO_2$ gas feed unit and a filter unit comprising half-burned dolomite, comprising $CaCO_3.MgO$, and preferably a $CO_2$ gas return/recycle unit; a mixing component for adjusting the concentration of anions, selected from the group comprising chloride and sulphate, preferably comprising a dosing unit for the addition to at least one part of the water one or more soles, preferably comprising $CaCl_2$, $MgCl_2$, $MgSO_4$, NaCl, NaF or KF. Further, the device can have a component for removing $CO_2$, preferably a vacuum degassing unit or a membrane degassing unit, in particular a vacuum degassing unit comprising a dosing unit for $O_2$ as stripping gas.

The arrangement of the components in the device is arbitrary, as long as the corresponding components are arranged after (i.e. downstream) the ion exchange. Preferably, the component for removing $CO_2$ is the last component in downstream direction.

The process and the device are particularly suitable to produce a drinking water with high silicate content, which may be used for the treatment of neurodegenerative diseases such as Alzheimer's.

Figure 3:
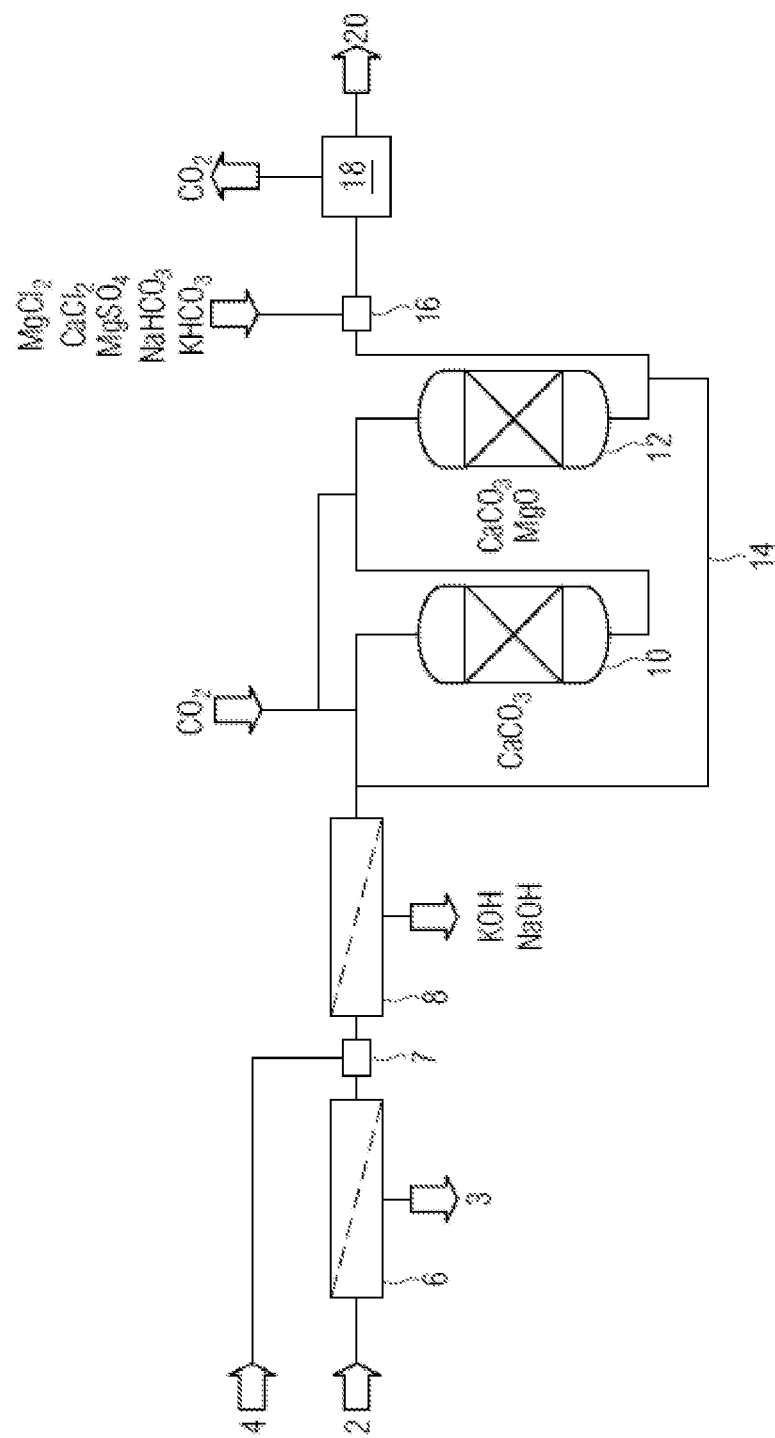
FIG. 3 shows schematically an embodiment of a device according to the present disclosure for the production of drinking water with high silicate content.
Figure 4:
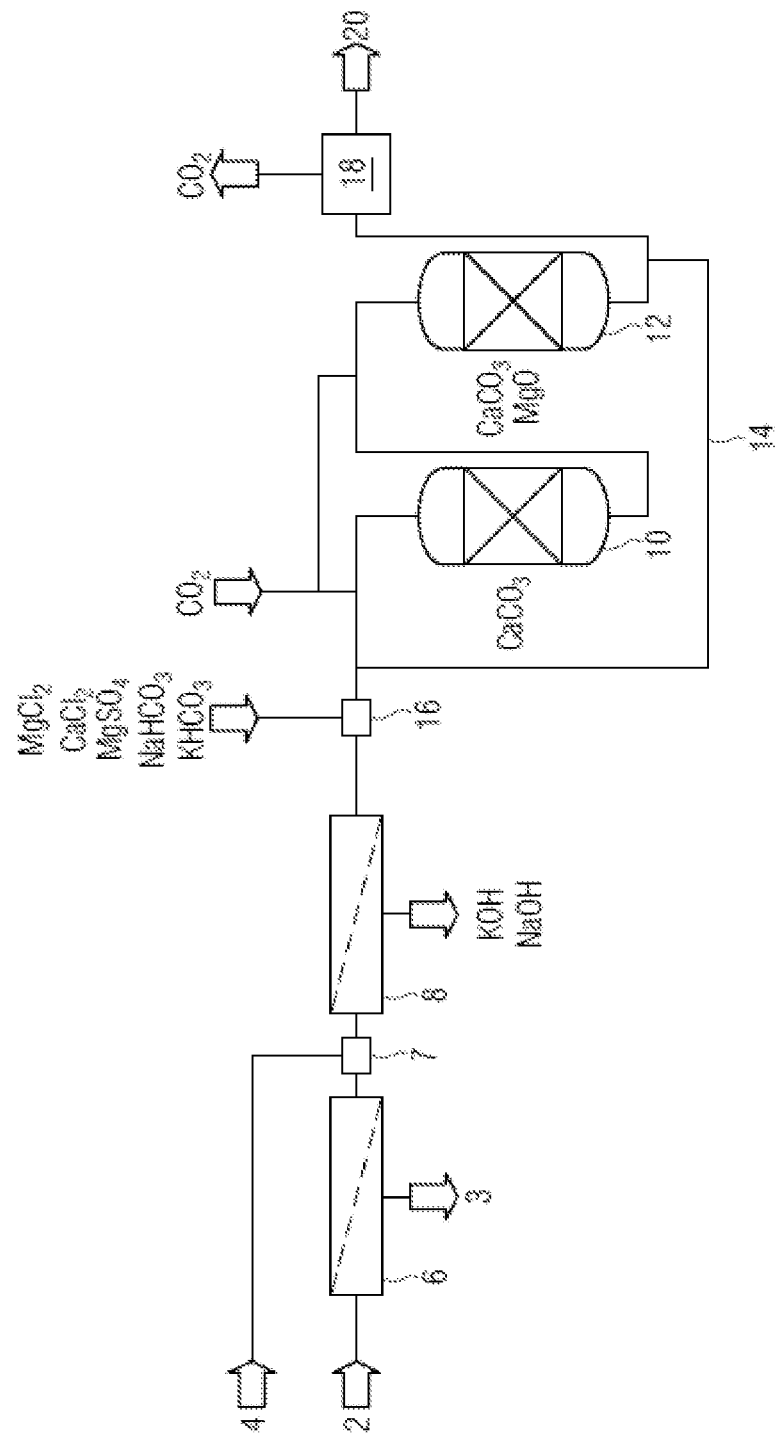
FIG. 4 shows schematically a further embodiment of a device for the production of drinking water with high silicate content, in accordance with the present disclosure.

Embodiments of the present disclosure and advantages are further explained based on the embodiments shown in FIG. 3 and FIG. 4.

FIG. 3 shows schematically an embodiment of a device according to the present disclosure for the production of drinking water with high silicate content. The device comprises as a component for the manufacture of demineralised raw water a reverse osmosis unit 6, a mixing device 7 for mixing the demineralized raw water and a waterglass solution, an ion exchanger 8, a component 10 for adjusting the concentration of calcium and/or hydrogen carbonate, comprising a $CO_2$ gas introduction unit and a filter unit comprising solid calcium carbonate, a component 12 to adjust the concentration of magnesium, comprising a $CO_2$ introduction unit and a filter unit comprising half-burned dolomite, a joint feedback line 14, to be able to conduct a part of the water again through the filter units, a mixing component 16 for adjusting the concentration of anions, as well as a component for removing $CO_2$, namely the vacuum degassing unit 18.

The embodiment according to FIG. 4 contains analogue units, only that the position of the mixing component 16 to adjust the concentration of anions is located prior (i.e. upstream) to the two components 10 and 12 to adjust the concentration of calcium and/or hydrogen carbonate and magnesium.

With the devices according to the FIG. 3 and FIG. 4 embodiments of the method can be performed as follows:

In the embodiment according to FIG. 3, raw water 2 is fed into the reverse osmosis unit 6, in which demineralised raw water is produced as permeate. In this process, concentrated wastewater with mineral substances is executed as retentate 3. In the mixing device 7, the demineralized raw water is then mixed with a waterglass solution 4, comprising sodium and/or potassium silicate. The mixture is then purified in the ion exchanger 8 (e.g. via reverse electrodialysis) in such a way that the concentration of sodium and/or potassium in the form of KOH and/or NaOH is dissipated, thus the concentration of sodium and/or potassium is reduced. Then $CO_2$ gas is added via a $CO_2$-transfer unit and the mixture is fed into component 10, comprising a filter with solid calcium carbonate. The concentration of calcium and/or hydrogen carbonate is set by adjusting the speed or the amount of flow through the filter. Then the mixture is passed in the component 12 through a filter of half-burned dolomite. If necessary, e.g. if the concentration is too low, a part of the water can be re-routed through the filters via a feedback line 14. In the subsequent mixing component 16, the concentration of anions is adjusted by placing the mixture in contact with one or more soles. In a final step, the remaining CO2 is removed via the vacuum degassing unit 18 to produce a still drinking water 20.

The procedure according to the embodiment of FIG. 4 is analogous, except that setting the concentration of anions occurs before setting the concentration of calcium and/or hydrogen carbonate and before setting the concentration of the magnesium.

What is claimed is:

1. A process for the production of drinking water with high silicate content, the process comprising:
   mixing demineralised raw water and a waterglass solution to form a mixture, the waterglass solution comprising sodium silicate and/or potassium silicate; and
   subjecting at least one part of the mixture to an ion exchange process to reduce a concentration of sodium and/or potassium;
   wherein the drinking water has a pH from 6.5 to 8.5, a conductivity from 50 to 500 µS/cm, a calcium ion concentration from 0.5 to 50 mg/L, a magnesium ion concentration from 0.5 to 50 mg/L, a potassium ion concentration from 0.5 to 20 mg/L, a sodium ion concentration from 0.5 to 50 mg/L, a chloride ion concentration from 0.5 to 50 mg/L, a hydrogen carbonate ion concentration from 0.5 to 350 mg/L, a silicate ion concentration from 15 to 250 mg/L, and a sulphate ion concentration from 0.5 to 50 mg/L.

2. The process according to claim 1, wherein the ion exchange process is a reverse electrodialysis process and/or an electro deionization process, and wherein the ion exchange process uses only a bipolar membrane and/or a cation membrane.

3. The process according to claim 1, wherein the waterglass solution is a potassium silicate waterglass solution.

4. The process according to claim 1, wherein mixing the demineralized raw water and the waterglass solution is carried out in such a way that silicate ion concentration in the mixture corresponds to a target concentration of silicate ions in the drinking water, and wherein the target concentration of silicate ions is 50 mg/L or higher.

5. The process according to claim 4, wherein the target concentration of silicate ions is 80 mg/L or higher.

6. The process according to claim 4, wherein the target concentration of silicate ions is 100 mg/L or higher.

7. The process according to claim 1, wherein the ion exchange process is carried out in such a way that the sodium ion concentration and/or the potassium ion concentration corresponds to a target concentration of sodium ions and/or potassium ions in the drinking water.

8. The process according to claim 7, wherein the target concentration of the sodium ions and/or the potassium ions in the drinking water is not greater than 20 mg/L.

9. The process according to claim 7, wherein the target concentration of the sodium ions and/or the potassium ions in the drinking water is not greater than 10 mg/L.

10. The process according to claim 1, further comprising adjusting the magnesium ion concentration with a method comprising bringing at least one part of the mixture into contact with a $CO_2$ gas stream followed by contacting the at least one part of the mixture with half-burned dolomite comprising $CaCO_3 \cdot MgO$.

11. The process according to claim 1, wherein adjusting the calcium ion concentration and/or the hydrogen carbonate ion concentration and/or adjusting the magnesium ion concentration are carried out after subjecting the at least one part of the mixture to the ion exchange process, and wherein adjusting the calcium ion concentration and/or the hydrogen carbonate ion concentration and adjusting the magnesium ion concentration are carried out in separate containers.

12. The process according to claim 1, further comprising adjusting the chloride ion concentration and/or the sulphate ion concentration using a method comprising bringing at least one part of the mixture into contact with one or more brines selected from $CaCl_2$, $MgCl_2$, $MgSO_4$, NaCl, NaF, and KF.

13. The process according to claim 1, further comprising removing $CO_2$ via vacuum degassing or membrane degassing to adjust the pH of the drinking water, wherein the vacuum degassing uses $O_2$ as a stripping gas.

14. A process for the production of drinking water with high silicate ion content, the process comprising:
mixing demineralised raw water and a waterglass solution to form a mixture, the waterglass solution comprising sodium silicate and/or potassium silicate;
subjecting at least one part of the mixture to an ion exchange process to reduce a concentration of sodium ions and/or potassium ions; and
adjusting a concentration of calcium carbonate ions and/or hydrogen carbonate ions using a process wherein at least one part of the mixture is brought into contact with $CO_2$ gas, subsequently contacting the at least one part of the mixture with solid calcium carbonate.

15. The process according to claim 14 further comprising adjusting a concentration of magnesium ions with a method comprising bringing at least one part of the mixture into contact with a $CO_2$ gas stream followed by contacting the at least one part of the mixture with half-burned dolomite comprising $CaCO_3 \cdot MgO$.

16. The process according to claim 15, wherein the drinking water has a pH from 6.5 to 8.5, a conductivity from 50 to 500 µS/cm, a calcium ion concentration from 0.5 to 50 mg/L, a magnesium ion concentration from 0.5 to 50 mg/L, a potassium ion concentration from 0.5 to 20 mg/L, a sodium ion concentration from 0.5 to 50 mg/L, a chloride ion concentration from 0.5 to 50 mg/L, a hydrogen carbonate ion concentration from 0.5 to 350 mg/L, a silicate ion concentration from 15 to 250 mg/L, and a sulphate ion concentration from 0.5 to 50 mg/L.

17. The process according to claim 14, wherein the ion exchange process is a reverse electrodialysis process and/or an electro deionization process, and wherein the ion exchange process uses only a bipolar membrane and/or a cation membrane.

18. A device for the production of drinking water with high silicate content, comprising:
a mixing device configured for mixing demineralised raw water with a waterglass solution to provide a mixture, the waterglass solution comprising sodium silicate and/or potassium silicate; and
an ion exchanger configured to subject at least one part of the mixture of an ion exchange process to reduce a concentration of sodium ions and/or potassium ions;
a vacuum degassing unit configured for removing $CO_2$, the vacuum degassing unit including a dosing unit for $O_2$ as a stripping gas.

19. The device according to claim 18, wherein the ion exchanger is a component for carrying out reverse electrodialysis and/or electro deionization, wherein the ion exchanger uses only a bipolar membrane and/or a cation membrane.

20. The device according to claim 18, further comprising one or more components selected from (i) a component for adjusting a concentration of calcium carbonate ions and/or hydrogen carbonate ions, the component comprising a $CO_2$ gas feed unit, a filter unit comprising solid calcium carbonate, and a $CO_2$ gas return unit; (ii) a component for adjusting the concentration of magnesium ions, the component comprising a $CO_2$ gas feed unit and a filter unit comprising half-burned dolomite comprising $CaCO_3 \cdot MgO$, and a $CO_2$ gas return unit; and (iii) a mixing component for adjusting a concentration of chloride anions and/or a concentration of sulphate anions, the mixing component comprising a dosing unit to bring at least one part of the mixture into contact with one or more brines wherein each of the one or more brines comprises $CaCl_2$, $MgCl_2$, $MgSO_4$, NaCl, NaF, or KF.

* * * * *